UNITED STATES PATENT OFFICE.

WENZL HEINL, JOHN HEINL, AND CHARLES BEYERL, OF ETNA, PENNSYLVANIA.

COMPOSITION FOR MANUFACTURING ARTIFICIAL STONE.

SPECIFICATION forming part of Letters Patent No. 645,392, dated March 13, 1900.

Application filed November 6, 1899. Serial No. 736,012. (No specimens.)

*To all whom it may concern:*

Be it known that we, WENZL HEINL, JOHN HEINL, and CHARLES BEYERL, citizens of the United States of America, residing at Etna, in the county of Allegheny and State of Pennsylvania, have invented certain new and useful Improvements in Compositions for the Manufacture of Artificial Stone, of which the following is a specification.

Our invention relates to a certain new and useful composition of matter to be used for the manufacture of artificial stone.

Our composition consists of the following ingredients: river-sand, cement, distilled water, carbonic acid, saltpeter, alcohol, and potash, which are combined in the proportions and manner herein set forth.

In the manufacture of the artificial stone composed of our new and useful composition we take four parts, by weight, of river-sand and one part, by weight, of cement, which are thoroughly commingled. Then add thereto sufficient distilled water to bring the same to a pasty substance, to which is added a composition consisting of five quarts distilled water and the following, computed by apothecary's weight: thirty-two drams carbonic acid, thirty-four drams of saltpeter, thirteen drams of alcohol, and twenty-one drams of potash, after which the composition is molded in the desired shape and thoroughly dried.

Particular attention is called to the fact that it is absolutely essential to use in this composition in both instances distilled water, which prevents the artificial stone after it has been thoroughly dried from becoming brittle, and particular attention is also called to the fact that the river-sand before mixing with the cement is thoroughly pulverized.

Having thus fully described our new and useful composition, what we claim as new, and desire to secure by Letters Patent, is—

1. The herein-described composition of matter for the manufacture of artificial stone, consisting of sand, cement, distilled water, carbonic acid, saltpeter, alcohol and potash, substantially as described.

2. The herein-described composition for the manufacture of artificial stone, consisting of four parts river-sand, one part cement, sufficient distilled water to bring the same to a pasty substance, thirty-two drams of carbonic acid, thirty-four drams saltpeter, thirteen drams of alcohol, twenty-one drams of potash, and five quarts distilled water, substantially as set forth.

3. The new and useful composition for the manufacture of artificial stone, consisting of sand, cement, water, acid, saltpeter, alcohol and potash combined in about the proportions herein specified.

In testimony whereof we affix our signatures in the presence of two witnesses.

WENZL HEINL.
JOHN HEINL.
CHARLES BEYERL.

Witnesses:
JOHN NOLAND,
JOHN GROETZINGER.